United States Patent
Shuto et al.

(10) Patent No.: US 6,204,324 B1
(45) Date of Patent: *Mar. 20, 2001

(54) METHOD FOR PRODUCING AQUEOUS SOLUTION OF POLYMER HAVING PHOSPHORYLCHOLINE GROUPS

(75) Inventors: Kenshiro Shuto; Kazuo Matsuyama, both of Isukuba (JP); Nobuo Nakabayashi, 5-6-20, Koganehara, Matsudo-shi, Chiba 270 (JP); Kazuhiko Ishihara, 3-16-37, Josuihoncho, Kodaira-shi, Tokyo 187 (JP)

(73) Assignees: NOF Corporation, Tokyo; Japan Science and Technology Corporation, Saitama; Nobuo Nakabayashi, Chiba; Kazuhiko Ishihara, Tokyo, all of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/750,102

(22) PCT Filed: Apr. 2, 1996

(86) PCT No.: PCT/JP96/00894

§ 371 Date: Dec. 2, 1996

§ 102(e) Date: Dec. 2, 1996

(87) PCT Pub. No.: WO96/31566

PCT Pub. Date: Oct. 10, 1996

(30) Foreign Application Priority Data

Apr. 3, 1995 (JP) .................................................... 7-077693
Apr. 1, 1996 (JP) .................................................... 8-787731

(51) Int. Cl.$^7$ ............................. C08L 43/00; C08L 43/02
(52) U.S. Cl. ................. 524/807; 210/500.21; 210/500.23; 210/500.26; 210/500.27; 210/500.29; 523/310; 524/547; 526/277; 526/278
(58) Field of Search .................... 524/547, 807; 526/277, 278; 210/500.26, 500.27, 500.29, 500.21, 500.23; 523/310

(56) References Cited

U.S. PATENT DOCUMENTS 4,348,329 * 9/1982 Chapman .................. 526/277 X
5,003,065 * 3/1991 Merritt et al. ................. 540/469
5,160,740 * 11/1992 Hasegawa et al. ............. 526/277
5,368,733 * 11/1994 Nakabayashi et al. ....... 210/500.23
5,461,433 * 10/1995 Nakabayashi et al. ........ 526/277 X
5,466,853 * 11/1995 Koinuma et al. .............. 558/169
5,648,442 * 7/1997 Bowers et al. ................ 526/277
5,658,561 * 8/1997 Nakabayashi et al. ......... 424/78.37
5,783,650 * 7/1998 Bowers et al. ................ 526/277

FOREIGN PATENT DOCUMENTS

86704 * 4/1988 (JP) ................................ 526/277
4-304882 10/1992 (JP) .
6-157270 6/1994 (JP) .
6-313009 11/1994 (JP) .
7-83923 3/1995 (JP) .

* cited by examiner

Primary Examiner—Judy M. Reddick
(74) Attorney, Agent, or Firm—Darby & Darby

(57) ABSTRACT

A method for producing an aqueous solution of a polymer having a phosphorylcholine group in which a polymerizable composition containing a polymerizable monomer having the phosphorylcholine group represented by the formula (1) is polymerized in the presence of a non-metal polymerization initiator soluble in a water-containing medium, to obtain a crude polymer aqueous solution, and the crude polymer aqueous solution is purified with a separation membrane, and an aqueous solution of the polymer having the phosphorylcholine group obtained by the method and having not more than 2000 ppm of impurities.

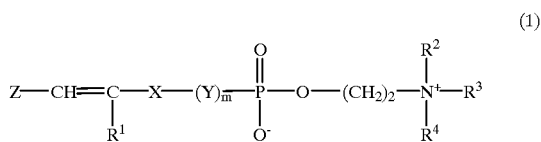

(1)

(X: a divalent organic residue, Y: an alkyleneoxy group having C1 to 6, Z: H, $R^5$—O—CO—($R^5$: an alkyl group of C1 to 10), $R^1$: H, $CH_3$, $R^2$, $R^3$, $R^4$: H, a hydrocarbon group or a hydroxy substituted hydrocarbon group of C1 to 6, m; 0 or 1)

3 Claims, No Drawings

METHOD FOR PRODUCING AQUEOUS SOLUTION OF POLYMER HAVING PHOSPHORYLCHOLINE GROUPS

FIELD OF THE INVENTION

The present invention relates to a method for producing an aqueous solution of a polymer having phosphorylcholine groups and the aqueous solution of the polymer containing the phosphorylcholine groups obtained by the production method. Particularly, it relates to a method for producing an aqueous solution of a polymer having phosphorylcholine groups and the aqueous solution of the polymer having the phosphorylcholine groups, which may be used as a starting material for cosmetics having skin beautifying effect and hair beautifying effect, or a starting material for a cleaning agent having excellent contamination proofing properties for a contact lens and a measuring cell for clinical survey, and which is capable of giving excellent function to a surface of a bio-related material.

BACKGROUND OF THE INVENTION

A polymer containing phosphorylcholine groups has high affinity for water, and thus is superior in moisture absorbing property and moisture-holding property. Further, because of its structure similar to a cellular membrane which is constituted of phospholipids, the polymer has excellent properties such as biocompatibility, non-activating ability of complement, lack of adsorbing property of biomolecules and cells, antithrombus property, and effect of stabilizing lipid bilayer. Research and development relating to synthesis and usage of the polymer aiming at development of the bio-related materials utilizing these properties have been actively performed.

However, although the polymer having the phosphrylcholine group has excellent properties, because of its significantly hydrophilic property as a polar substance, it tends to take harmful polar substances and metals which mingle during the process of manufacturing, e.g. polar substances such as amines, alcohols and carboxylic acids contained in or derived from the starting materials thereof or generated by degradation of the formed polymer; transition metals, organic peroxides and azo compounds added as a polymerization initiator; and degradation products thereof. Upon utilizing a purified product of the polymer as a bio-related material, these impurities may affect safety, odor and configuration of the final product, and frequently give a crucial defect for commercialization.

As a purification method for removing the impurities, some attempts of membrane separation methods in a medium containing water, i.e. in a water system, have been made. However, in any case, impurities which show toxicity or stimulation remains in a large amount in the product, and thus practical use of the polymer as a bio-related material is difficult.

For example, an attempt has been made in which polymerization reaction is performed utilizing an oil-soluble polymerization initiator such as azobisisobutyronitrile in a solvent such as ethanol, and impurities is then removed by a membrane separation method such as dialysis in a water-containing medium (Japanese Laid-open Patent Application Nos. 4-304882 and 6-157270). In these methods, the polymerization initiator and the degradation products thereof as the impurities have oil-soluble character, and are thus difficult to be removed by the membrane separation method in a water system. In addition, dinitryl tetramethylsuccinate, a degradation product of azobisisobutyronitrile, is known to have high toxicity. Then, it may be considered to enhance the oil-soluble character of the water-containing medium. But in this case, removal of polar substances becomes difficult.

Alternatively, there is proposed a method in which a radical is generated on water-soluble cellulose by a cerium ion-containing compound, to graft-copolymerize 2-(methacryloyloxy)ethyl-2-(trimethylammonio)ethyl phosphate in an aqueous solution, and the polymer aqueous solution obtained is then purified by dialysis to remove cerium ions (Japanese Laid-open Patent Application No. 5-220218).

However, a polymerization initiator containing metals such as cerium tends to form a complex with the obtained polymer, and is difficult to be removed sufficiently even by membrane separation in the water system. In this application, it is mentioned that cerium ions were not detected in the purified product extracted with water, and therefore was sufficiently removed. However, in fact, the amounts of cerium ions before and after the purification were not evaluated, and, in addition, the amount of monomers containing the phosphorylcholine groups in the aqueous solution sample after graft-polymerization, which was subjected to detection, was merely a slight amount, i.e. about 10 mg. Thus, it is hardly recognized that whether cerium ions were sufficiently removed from the polymer having the phosphorylcholine groups or not was well evaluated. In practice, the removal of cerium ions is not complete.

Therefore, it has not conventionally known an aqueous solution containing a polymer having phosphorylcholine groups which contains very little amount of impurities or does not contain the impurities at all, let alone a method for effective removal of the impurities, such as polar impurities and toxic impurities, from an aqueous solution containing a polymer having the phosphorylcholine groups.

DISCLOSURE OF THE INVENTION

The object of the present invention is to provide an aqueous solution of a polymer having phosphorylcholine groups, which has very low concentration of impurities such as polar substances and toxic substances, which contains high purity of the polymer having the phosphorylcholine groups, and which has almost no stimulation or odor, and a production method thereof.

According to the present invention, there is provided a method for producing an aqueous solution of a polymer having a phosphorylcholine group characterzed in that said method comprises the steps of polymerizing a polymerizable composition containing a polymerizable monomer having the phosphorylcholine group represented by the formula (1) (referred to as the "polymerizable monomer A" hereinbelow) in the presence of a non-metal polymerization initiator soluble in a water-containing medium, to obtain a crude polymer aqueous solution, and then purifying said crude polymer aqueous solution with a separation membrane.

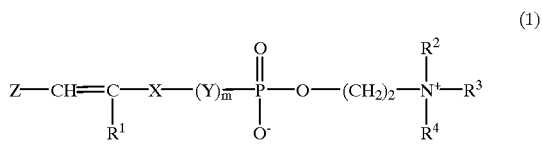

(wherein X denotes a divalent organic residue, Y denotes an alkyleneoxy group having 1 to 6 carbon atoms, and Z denotes a hydrogen atom or $R^5$—O—CO— (wherein $R^5$ denotes an alkyl group having 1 to 10 carbon atoms or a hydroxyalkyl group having 1 to 10 carbon atoms.). $R^1$ denotes a hydrogen atom or a methyl group, $R^2$, $R^3$ and $R^4$ are the same or different groups and denote a hydrogen atom, or a hydrocarbon or hydroxyhydrocarbon group having 1 to 6 carbon atoms. m denotes 0 or 1.)

According to the present invention, there is also provided an aqueous solution of a polymer having a phosphorylcholine groups obtained by the aforementioned production method, comprising a polymer having the phosphorylcholine group obtained by polymerization of a polymerizable composition containing a polymerizable monomer A represented by the formula (1) using a non-metal polymerization initiator soluble in a water-containing medium, a content of impurities in said aqueous solution being not more than 2000 ppm with respect to a total amount of the polymer having the phosphorylcholine group and the impurities.

BEST MODE FOR CARRYING OUT THE INVENTION

The present invention will be described more in detail hereinbelow.

The aqueous solution of the polymer having the phosphorylcholine groups of the present invention is an aqueous solution which is obtained by polymerizing a polymerizable composition containing a polymerizable monomer A represented by the formula (1) in the presence of a non-metal polymerization initiator soluble in a water-containing medium (referred to as "water-soluble polymerization initiator B" hereinbelow) by a production method to be described later, and purifying the obtained mass by a specific purification method, and which contains a polymer having the phosphorylcholine groups obtained by the aforementioned polymerization, and impurities of not more than 2000 ppm, usually 1 to 500 ppm, and preferably not more than 200 ppm, with respect to the total amount of the polymer having the phosphorylcholine groups and the impurities. As used herein, the impurities substantially mean by-products of the polymerization or residues other than the polymer having the phosphorylcholine groups which contains polymerization units originated from the polymerizable monomer A represented by the formula (1) contained as a requisite compoment in high purity, and a water-containing medium as a medium. The examples of the impurities may include polar substances, toxic impurities, and the polymerizable monomer remaining unreacted. Thus, various stabilizing agents and additives added to the aqueous solution subsequent to the specific purification to be discussed later upon utilizing the aqueous solution of the polymer having the phosphorylcholine groups of the present invention for various use, are not regarded as the impurities. The aqueous solution of the polymer having the phosphorylcholine groups of the present invention is produced employing a non-metal polymerization initiator as a polymerization initiator, and therefore contains no metals originated from the polymerization initiator containing metals, nor metals which have harmful effect to organisms, such as transition metals.

The number average molecular weight of the polymer having the phosphorylcholine groups contained in the aqueous solution of the polymer having the phosphorylcholine groups is preferably 1000 to 5000000, and more preferably 2000 to 1000000. The polmerizable monomer A contained as a requisite material in the polymerizable composition, i.e. the starting material of this polymer, is represented by the above formula (1).

In the formula (1), the divalent organic residue X may specifically include divalent organic residues enumerated below. In the formulae, n denotes an integer of 1 to 10.

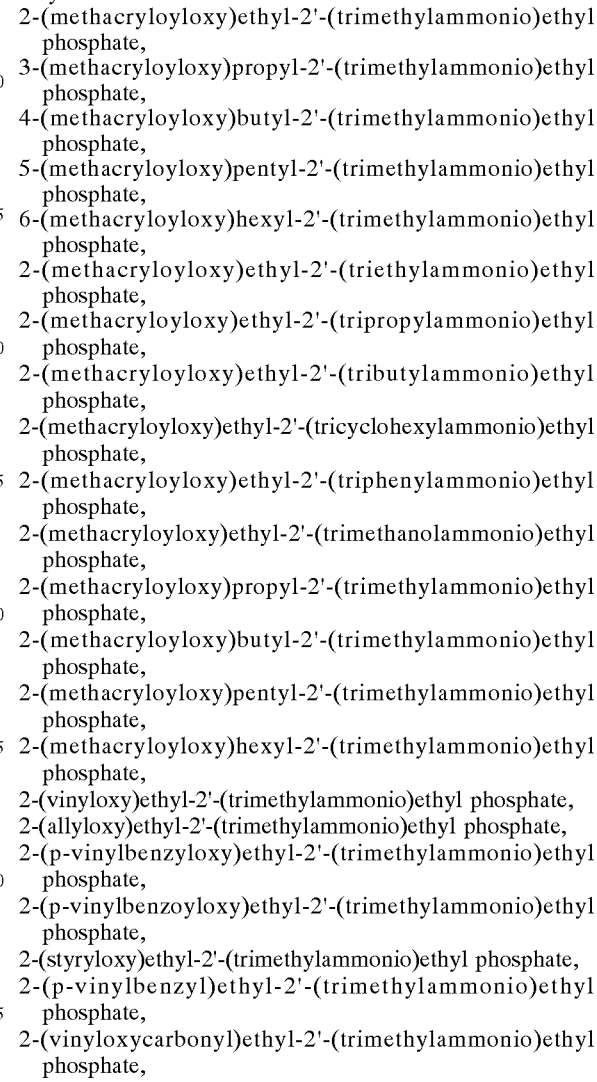

The hydrocarbon group having 1 to 6 carbon atoms represented by $R^2$ to $R^4$ in the formula (1) may include an alkyl group, a cycloalkyl group, a phenyl group and an alcoxy group.

If the number of carbon atoms in Y or $R^2$ to $R^4$, the number of carbon atoms in $R^5$, the value of m in the formula (1), or the value of n in the examples of the divalent organic residues X exceeds the defined upper limit, the production becomes difficult.

The specific examples of the polymerizable monomer A may include 2-(methacryloyloxy)ethyl-2'-(trimethylammonio)ethyl phosphate, 3-(methacryloyloxy)propyl-2'-(trimethylammonio)ethyl phosphate, 4-(methacryloyloxy)butyl-2'-(trimethylammonio)ethyl phosphate, 5-(methacryloyloxy)pentyl-2'-(trimethylammonio)ethyl phosphate, 6-(methacryloyloxy)hexyl-2'-(trimethylammonio)ethyl phosphate, 2-(methacryloyloxy)ethyl-2'-(triethylammonio)ethyl phosphate, 2-(methacryloyloxy)ethyl-2'-(tripropylammonio)ethyl phosphate, 2-(methacryloyloxy)ethyl-2'-(tributylammonio)ethyl phosphate, 2-(methacryloyloxy)ethyl-2'-(tricyclohexylammonio)ethyl phosphate, 2-(methacryloyloxy)ethyl-2'-(triphenylammonio)ethyl phosphate, 2-(methacryloyloxy)ethyl-2'-(trimethanolammonio)ethyl phosphate, 2-(methacryloyloxy)propyl-2'-(trimethylammonio)ethyl phosphate, 2-(methacryloyloxy)butyl-2'-(trimethylammonio)ethyl phosphate, 2-(methacryloyloxy)pentyl-2'-(trimethylammonio)ethyl phosphate, 2-(methacryloyloxy)hexyl-2'-(trimethylammonio)ethyl phosphate, 2-(vinyloxy)ethyl-2'-(trimethylammonio)ethyl phosphate, 2-(allyloxy)ethyl-2'-(trimethylammonio)ethyl phosphate, 2-(p-vinylbenzyloxy)ethyl-2'-(trimethylammonio)ethyl phosphate, 2-(p-vinylbenzoyloxy)ethyl-2'-(trimethylammonio)ethyl phosphate, 2-(styryloxy)ethyl-2'-(trimethylammonio)ethyl phosphate, 2-(p-vinylbenzyl)ethyl-2'-(trimethylammonio)ethyl phosphate, 2-(vinyloxycarbonyl)ethyl-2'-(trimethylammonio)ethyl phosphate, 2-(allyloxycarbonyl)ethyl-2'-(trimethylammonio)ethyl phosphate,
2-(acryloylamino)ethyl-2'-(trimethylammonio)ethyl phosphate,
2-(vinylcarbonylamino)ethyl-2'-(trimethylammonio)ethyl phosphate,
ethyl-(2'-trimethylammonioethylphosphorylethyl)fumarate,
butyl-(2'-trimethylammonioethylphosphorylethyl)fumarate,
hydroxyethyl-(2'-trimethylammonioethylphosphorylethyl)-fumarate,
ethyl-(2'-trimethylammonioethylphosphorylethyl)maleate,
butyl-(2'-trimethylammonioethylphosphorylethyl)maleate, and
hydroxyethyl-(2'-trimethylammonioethylphosphorylethyl)-maleate, all of which may be used alone or as a mixture.

The polymerizable monomer A may be prepared by publicly known methods such as those described in Japanese Laid-open Patent Application Nos. 54-63025, 58-154591, 63-222183, 5-107511 and 6-41157, and WO93/01221.

The polymerizable composition containing the polymerizable monomer A may contain other polymerizable monomer than the polymerizable monomer A, which can be copolymerized by radical polymerization with the polymerizable monomer A.

The above-mentioned other polymerizable monomer copolymerized by radical polymerization with the polymerizable monomer A desirably exhibit at least slight solubility in a water-containing medium. Specifically, the other polymerizable monomer may include, e.g. styrene, methylstyrene, chloromethylstyrene, methyl acrylate, methyl methacrylate, ethyl acrylate, ethyl methacrylate, butyl acrylate, butyl methacrylate, acrylic acid, methacrylic acid, acrylic amide, methacrylic amide, 2-hydroxyethyl acrylate, 2-hydroxyethyl methacrylate, ethyl vinyl ether, butyl vinyl ether, N-vinylpyrrolidone, vinyl chloride, vinylidene chloride, ethylene, propylene, isobutylene, or acrylonitrile.

The desirable mixing amount of the above-mentioned radically-polymerizable other polymerizable monomer is 5 to 1000 parts by weight, and preferably 10 to 100 parts by weight with respect to 100 parts by weight of polymerizable monomer A. If the mixing amount of the other polymerizable monomer exceeds 1000 parts by weight, the obtained polymer may not exhibit properties such as solubility in the water-containing medium or biocompatibility, and if less than 5 parts by weight, the copolymerization effect of the other polymerizable monomer may not be achieved, thus not being preferable.

According to the method for producing an aqueous solution of a polymer having phosphorylcholine groups of the present invention, a polymerizable composition containing the polymerizable monomer A is polymerized in the presence of the water-soluble polymerization initiator B soluble in the water-containing medium, to obtain a crude polymer aqueous solution.

The water-soluble polymerization initiator B is a non-metal polymerization initiator which is soluble in a water-containing medium. Being soluble in a water-containing medium means showing solubility in a water-containing medium in the crude polymer aqueous solution which will be subjected to purification by a separation membrane as will be explained later, and preferably being dissolved uniformly in the water-containing medium in the crude polymer aqueous solution. Specifically, it is desirable that the initiator B is a radical polymerization initiator capable of being dissolved in water in at least not less than 0.1 wt % at ordinary temperature, and capable of being dissolved in a water-containing medium in at least not less than 1 wt % by selecting a suitable medium. For example, it is preferable that the initiator B is a polymerization initiator having one or more kinds of hydrophilic groups selected from the group consisting of a hydroxyl group, a carboxyl group and an amido group having high solubility in a water-containing medium. If the initiator B has an acid functional group such as a carboxyl group, it may be neutralized to elevate solubility in a water-containing medium before use.

The water-soluble polymerization initiator B may include organic peroxides such as succinic peroxide, glutaric peroxide, succinic peroxyglutarate, t-butyl peroxymaleate, t-butyl peroxypivalate, di-2-ethoxyethyl peroxydicarbonate, or 3-hydroxy-1,1-dimethylbutyl peroxypivalate; azo compounds such as 1-((1-cyano-1-methylethyl)azo)formamide, 2,2'-azobis(2-methyl-N-phenylpropionamidine) dihydrochloride, 2,2'-azobis(N-(4-chlorophenyl)-2-methylpropionamidine)dihydrochloride, 2,2'-azobis(N-(4-hydroxyphenyl)-2-methylpropionamidine)dihydrochloride, 2,2'-azobis(N-(4-aminophenyl)-2-methylpropionamidine) tetrahydrochloride, 2,2'-azobis(2-methyl-N-(phenylmethyl) propionamidine)dihydrochloride, 2,2'-azobis(2-methyl-N-2-propenylpropionamidine)dihydrochloride, 2,2'-azobis(2-methylpropionamidine)dihydrochloride, 2,2'-azobis(N-(2-hydroxyethyl)-2-methylpropionamidine)dihydrochloride, 2,2'-azobis(2-(5-methyl-2-imidazolin-2-yl)propane) dihydrochloride, 2,2'-azobis(2-(2-imidazolin-2-yl)propane) dihydrochloride, 2,2'-azobis(2-(4,5,6,7-tetrahydro-1H-1,3-diazepin-2-yl)propane)dihydrochloride, 2,2'-azobis(2-(3,4, 5,6-tetrahydropyrimidin-2-yl)propane dihydrochloride, 2,2'-azobis(2-(5-hydroxy-3,4,5,6-tetrahydropyrimidin-2-yl) propane)dihydrochloride, 2,2'-azobis(2-(1-(2-hydroxyethyl)-2-imidazolin-2-yl)propane)dihydrochloride, 2,2'-azobis(2-(2-imidazolin-2yl)propane, 2,2'-azobis(2-methyl-N-(1,1-bis(hydroxymethyl)-2-hydroxyethyl) propionamide), 2,2'-azobis(2-methyl-N-(1,1-bis (hydroxymethyl)ethyl)propionamide), 2,2'-azobis(2-methyl-N-(2-hydroxyethyl)propionamide), 2,2'-azobis(2-methylpropionamide)dihydrate, 4,4'-azobis(4-cyanopentanoic acid), or 2,2'-azobis(2-hydroxymethyl) propionitrile), all of which may be used alone or as a mixture.

Most of the degradation products of the examples of the water-soluble polymerization initiator B, particularly of the examples of the peroxides, are almost atoxic substances such as alcohols, carboxylic acid and alkanes. In the case of employing such polymerization initiator the degradation products of which are atoxic, even if the the water-soluble polymerization initiator B itself has high toxicity, it can be detoxicated by, for example, heat treatment after polymerization, which is particularly preferable because the safety of the obtained product may be increased in comparison with the case of employing a transition metal ion as a polymerization initiator. Thus, the examples of the most suitable water-soluble polymerization initiator B may include succinic peroxide, glutaric peroxide, and succinic peroxyglutarate.

In the method for producing the aqueous solution of the polymer having the phosphorylcholine groups of the present invention, the polymerzation of the polymerizable composition containing the polymerizable monomer A in the presence of the water-soluble polymerization initiator B is preferably performed by, for example, a conventional solution polymerization method using a water-containing medium such as water, an aqueous solution or a water-organic substance mixed medium; or an organic medium. The polymerization may also be performed by the method other than the solution polymerization, e.g. a suspension polymerization, an emulsion polymerization, or a bulk polymerization. As to the polymerization condition of the solution polymerization, the polymerization temperature may be in the range of 5 to 100° C., and the polymerization time is 10 minutes to 20 hours. In this case, the polymerizable composition containing the polymerizable monomer A, and the water-soluble polymerization initiator B may be dissolved in the medium in advance, or may also be added afterward successively or continuously.

As to the mixing ratio of the polymerizable composition containing the polymerizable monomer A and the water-soluble polymerization initiator B upon polymerization, the mixing ratio of the water-soluble polymerization initiator B is preferably 0.01 to 20 parts by weight, and more preferably 0.1 to 10 parts by weight, with respect to the 100 parts by weight of the polymerizable composition containing the polymerizable monomer A. In the case of performing this polymerization reaction employing a water-containing medium or an organic medium, e.g. in the case of performing the solution polymerization, the mixing ratio of the polymerizable composition (polymerizable monomers) is preferably in the range of 5 to 200 parts by weight, and more preferably 10 to 100 parts by weight, with respect to 100 parts by weight of the medium.

The aqueous solution for the water-containing medium may include a buffer such as a phosphate buffer, a tris-HCl buffer, a carbonate buffer, a borate buffer and a citrate buffer; a saline, or a mixture thereof. Antiseptics may be added to these solutions, if necessary. On the other hand, the water-organic substance mixed medium is a medium capable of improving solubility of the water-soluble polymerization initiator B, the polymerizable composition and the polymer to be purified, and may preferably contain not less than 5 wt %, and more preferably 20 to 80 wt % of the organic medium with respect to water. The preferable organic medium for this water-organic substance mixed medium may include water-soluble organic mediums such as methanol, ethanol, propanol, butanol, ethylene glycol, glyceline, tetrahydrofuran, acetone, methyl ethyl ketone, diethyl ketone, acetonitrile and nitrobenzene. The organic medium may preferably include those exemplified as water-soluble organic mediums for the above-mentioned water-organic substance mixed medium.

Upon the polymerization, a chain transfer agent soluble in the water-containing medium such as mercaptoacetic acid and mercaptoethanol, may be used in order to control the molecular weight of the polymer having the phosphorylcholine groups to be generated.

In the above polymerization reaction;

(i) The mixture containing the polymer having the phosphorylcholine groups, the water-containing medium, the polymerizable monomer remaining unreacted, the polymerization initiator and degradation products of the polymerization initiator, obtained by the solution polymerization in the water-containing medium is the most preferable in terms of simplification of the steps in process, because the mixture as it is may be subjected as the crude polymer aqueous solution to the subsequent purification step with the separation membrane, without the step of removing the water-containing medium and/or impurities desirable to be removed. In this case, the generated mixture may be admixed with an additional water-containing medium, to prepare the crude polymerizable aqueous solution. Also, the generated mixture may be concentrated to adjust the concentration of the contained polymer having the phosphorylcholine groups, for preparing the crude polymerizable aqueous solution.

(ii) The mixture containing the polymer having the phosphorylcholine groups, the water-containing medium, the polymerizable monomer remaining unreacted, the polymerization initiator, and degradation products of the polymerization initiator, obtained by polymerization employing the suspension polymerizing method or the emulsion polymerizing method in water-containing medium, may be admixed with an additional water-containing medium, to prepare a crude polymerizable aqueous solution.

(iii) The mixture containing the polymer having the phosphorylcholine groups, the organic medium, the polymerizable monomer remaining unreacted, the polymerization initiator, and degradation products of the polymerization initiator, obtained by polymerization employing the solution polymerizing method, the suspension polymerizing method or the emulsion polymerizing method in the organic medium, may be subjected to the steps of taking the product containing the polymer out of the organic medium, i.e. removing the organic medium contained in the generated mixture, for example, by a precipitation method or a concentrating operation, and then admixing with the water-containing medium, to prepare a crude polymerizable aqueous solution. If the organic medium employed is the water-soluble organic medium, the crude polymerizable aqueous solution may be prepared by simply adding a water-containing medium to the generated mixture.

(iv) The mixture containing the polymer having the phosphorylcholine groups, the polymerizable monomer remaining unreacted, the polymerization initiator, and degradation products of the polymerization initiator, obtained by the bulk polymerization method substantially without any medium, may be admixed with a water-containing medium, to prepare a crude polymerizable aqueous solution.

The water-containing medium optionally added upon preparing the crude polymerizable aqueous solution from each of the mixture generated by the polymerization may preferably include those enumerated as the example of the water-containing medium which may be used upon polymerization.

In sum, the crude polymerizable aqueous solution is a solution prepared by dissolving the mixture containing the polymer having the phosphorylcholine groups obtained by the polymerization reaction in the aforementioned water-containing medium such as water, an aqueous solution or a water-organic substance mixed medium, for the subsequent purification step. In the case of employing the water-organic substance mixed medium, the mixing ratio of water to the organic medium may vary depending on the kind of the aforementioned polymer, but, in general, is preferably 5:95 to 90:10, and more preferably 20:80 to 80:20. The concentration of the polymer having the phosphorylcholine groups contained in the crude polymerizable aqueous solution is not particularly limited as long as the polymer may be substantially dissolved in the solution, but in the industrial practice, the concentration of the polymer having the phosphorylcholine groups in the crude polymer aqueous solution is preferably in the range of 0.5 to 80 wt %, and more preferably 5 to 50 wt %.

In the production method of the present invention, the crude polymer aqueous solution is subsequently purified by the separation membrane, to obtain the aqueous solution of the polymer having the phosphorylcholine groups as the final product which has very low concentration of the impurities as mentioned above, and which may be utilized as the bio-related material.

The separation membrane for purifying the crude polymer aqueous solution is not particularly limited as long as it has molecular cutoff capable of separating low molecular weight substances such as the impurities to be removed from the polymer having the phosphorylcholine groups, and may include a ultrafiltration membrane, a dialysis membrane and a reverse osmosis membrane. Specifically, those made of an ordinary material which may be utilized for water-containing medium, such as cellulose, nitrocellulose, acetylcellulose, polysulfone, nylon, polytetrafluoroethylene, polyvinyl chloride, polyacrylate, polyethylene, polypropylene, glass, ceramics, may be used. The configuration of the separation membrane may include a flat form, a cylindrical form, a spiral laminate form, and a hollow fiber form.

The purification by the separation membrane may be performed by ultrafiltration, dialysis, reverse osmosis, or a combination thereof.

The ultrafiltration is a process in which the crude polymer aqueous solution is contacted with the separation membrane, and pressure is applied on the crude polymer aqueous solution side or negative pressure is set on the permeated liquid side, for removing the low molecular weight impurities such as the polymerization initiator, the degradation products of the polymerization initiator, the remaining monomers and the chain transfer agent together with the permeated liquid. In this case, the polymer in the crude polymer aqueous solution is concentrated as the ultrafiltration proceeds. Thus by adding the water-containing medium into the crude polymer aqueous solution for diluting the crude polymer aqueous solution and repeating the ultrafiltration, the concentration of the impurities may be further lowered.

The dialysis is a method in which the crude polymer aqueous solution is contacted with the water-containing medium with the separation membrane interposed therebetween, to diffuse the low molecular impurities to the water-containing medium for removing. The dialysis may be performed by a batch system. In this case, the amount of the water-containing medium is desirably not less than 10 parts by weight with respect to 100 parts by weight of the crude polymer aqueous solution, and the larger the amount of the water-containing medium is, the more the concentration of the impurities may be decreased. The concentration of the impurities in the crude polymer aqueous solution may be further decreased by changing the water-containing medium repeatedly. The dialysis may also be performed continuously by pouring the crude polymer aqueous solution and the water-containing medium continuously on the surface of the separation membrane, to shorten the process time for efficient dialysis.

The reverse osmosis is a method in which the crude polymer aqueous solution is contacted with the water-containing medium with the reverse osmosis separation membrane interposed therebetween, and pressure is applied on the crude polymer aqueous solution side or negative pressure is set on the water-containing medium side, for permeation and removal of the low molecular weight impurities such as polymerization initiator, the degradation products of the polymerization initiator and the remaining monomers, as the medium of the crude polymer aqueous liquid permeates to the water-containing medium side. In this case, the polymer in the crude polymer aqueous solution is concentrated as the reverse osmosis proceeds, and thus by adding water-containing medium into the crude polymer aqueous solution for diluting the crude polymer aqueous solution and repeating the reverse osmosis, the concentration of the impurities may be further lowered.

The purification by the separation membrane may be performed at the temperature ranging from −10 to 99° C. If the water-containing medium which has a possibility of propagation of bacteria therein during the purification, the purification is desirably performed at as low temperature as possible, i.e. in a range of about −10 to 10° C. If the treatment is performed at not higher than 0° C., an anti-freezing agent such as alcohols may be added to the water-containing medium for preventing freezing.

The aqueous solution of the polymer having the phosphorylchorine groups obtained by such purification with the purification membrane has an increased content of the polymer having the phosphorylcholine groups with high purity by the repeated concentration by the purification, and thus is capable of handling as a high-concentration starting material, thus being preferable. Therefore, upon utilizing the obtained aqueous solution of the polymer having the phosphorycholine groups as the starting material for various use such as cosmetics, a cleaning agent and a surface treatment agent, the solution will generally be diluted to a desired concentration for use. For example, for cosmetics, a cleaning agent or a surface treatment agent, the function of the aqueous solution of the polymer having the phosphorylcholine groups may be exhibited effectively even by the addition of not more than 1 wt % of the solution to the starting materials for the above use. For handling as a starting material, the aqueous solution of the polymer having the phosphorylcholine groups preferably has a high concentration. Particularly, in the case of adding a stabilizer such as an antiseptic or an antioxidant to the solution, it is preferable that the aqueous solution of the polymer having the phosphorylcholine groups preferably has a high concentration so that the ratio of the stabilizer to be added with respect to the aqueous solution of the polymer having the phosphorylcholine groups may be lowered. However, if the concentration of the polymer in the aqueous solution of the polymer having the phosphorylcholine groups is too high, the flowability thereof becomes poor, thus not being preferable. Therefore, the concentration of the polymer in the aqueous solution of the polymer having the phosphorylcholine groups, for cosmetics, a cleaning agent, a surface treatment agent, or the like may usually be 5 to 60 wt %, and preferably 10 to 50 wt %. The concentrating of the aqueous solution of the polymer having the phosphorylcholine groups to such preferable concentration may perferably be performed upon purification by the membrane separation such as the ultrafiltration and the reverse osmosis, but may also be performed subsequent to the membrane separation by solvent evaporation, all of which maybe performed repeatedly.

The aqueous solution of the polymer having the phosphorylcholine groups of the present invention has very low concentration of the impurities, has high purity of the polymer, and has almost no toxicity, stimulation or odor due to the impurities, and thus useful for a bio-related material and a starting material for cosmetics which are required to meet strict standard. Also, the aqueous solution of the polymer having the phosphorylcholine groups of the present invention has particularly low amount of impurities such as an acid and a base which may act as a catalyst, and is chemically stable, which lowers the possibility of deterioration and which enables long-term storage. In addition, the polymer which may be obtained by subjecting the aqueous solution of the polymer having the phosphorylcholine groups to evaporation and drying directly or after precipitation and filtration for removing the water-containing medium, is also stable without deterioration.

With the production method of the present invention, since the polymerization is performed employing the non-metal polymerization initiator soluble in the water-containing medium, and since the crude polymer aqueous solution is subjected to the separation membrane purification, the aqueous solution of the polymer having the phosphorylcholine groups can be produced readily and efficiently in an industrial scale. Particularly, in the case of employing the solution polymerization method in water-containing medium, the mixture containing the polymer having the phosphorylcholine groups, the water-containing medium, the polymerizable monomer remaining unreacted, the polymerization initiator and the degradation products thereof obtained by the polymerization, can be subjected as the crude polymer aqueous solution to the subsequent purification step with the separation membrane without the preceding removing step of the water-containing medium and/or impurities desirable to be removed, and thus the procedure may be the simplest, and the polymer aqueous solution containing the polymer having the phosphorylcholine groups at high purity, which has very low concentration of the aforementioned impurities, can be obtained.

EXAMPLES

The present invention will be described more in detail with reference to Examples and Comparative Examples hereinbelow, but the present invention is not limited thereto. The number average molecular weights shown in Examples and Comparative Examples are calculated in terms of polyethylene glycol as a standard material. The amounts of impurities are shown by the weight ratio with respect to the polymer.

Example 1

20 g (67.8 mmol) of 2-(methacryloyloxy)ethyl-2'-(trimethylammonio)ethyl phosphate and 0.6 g (2.56 mmol) of succinic peroxide were dissolved in 80 g of ion-exchanged water, and bubbled for one hour by blowing nitrogen thereinto. Subsequently, the temperature of the solution was raised up to 70° C. for performing polymerization for 5 hours to obtain a crude polymer aqueous solution containing 19.5 wt % of a polymer. After finishing the reaction, the crude polymer aqueous solution was contacted with a dialysis membrane having molecular cutoff of 6000 to 8000, manufactured by SPECTRAPORE CO., and dialyzed for 72 hours, using 15 liter of ion-exchanged water as a dialysis liquid, which was exchanged once in every 24 hours and two times in the whole dialysis. The polymer aqueous solution obtained was then subjected to gel permeation chromatography and liquid chromatography, for measurement of molecular weight and impurities. The polymer contained in the polymer aqueous solution obtained had phosphorylcholine groups, and had the number average molecular weight of 69000. 0.8 ppm of 2-(methacryloyloxy)ethyl-2'-(trimethylammonio)ethyl phosphate, 0.1 ppm of succinic peroxide, and 0.2 ppm of degradation products of the polymerization initiator were contained as the impurities. The polymer aqueous solution was odorless. The content of the polymer in the polymer aqueous solution obtained was 15.2 wt %, and the amount of the impurities with respect to the total amount of the polymer and the impurities was 7.2 ppm.

Example 2

10 g (33.9 mmol) of 2-(methacryloyloxy)ethyl-2'-(trimethylammonio)ethyl phosphate and 0.03 g (0.17 mmol) of t-butyl peroxypivalate were dissolved in 90 g of ethanol, and bubbled for one hour by blowing nitrogen thereinto. Subsequently, the temperature of the solution was raised up to 60° C. for performing polymerization for 4 hours. After finishing the reaction, the polymer solution obtained was added dropwise to 1.5 liter of acetone. The precipitate obtained was dissolved in water to prepare a crude polymer aqueous solution containing 32.5 wt % of the polymer. The crude polymer aqueous solution was subjected to dialysis by the same method as in Example 1, thereby obtaining a polymer aqueous solution. The molecular weight and impurities were measured by the same method as in Example 1. The polymer contained in the polymer aqueous solution obtained had phosphorylcholine groups, and had the number average molecular weight of 35000. 0.3 ppm of 2-(methacryloyloxy)ethyl-2'-(trimethylammonio)ethyl phosphate, 0.2 ppm of t-butyl peroxypivalate, 0.3 ppm of degradation products of the polymerization initiator, 1.5 ppm of ethanol, and 0.8 ppm of acetone were contained as the impurities. The polymer aqueous solution was odorless. The content of the polymer in the polymer aqueous solution obtained was 27.4 wt %, and the amount of the impurities with respect to the total amount of the polymer and the impurities was 11.3 ppm.

Example 3

40 g (136 mmol) of 2-(methacryloyloxy)ethyl-2'-(trimethylammonio)ethyl phosphate and 0.04 g (0.23 mmol) of t-butylperoxypivalate were dissolved in 60 g of ethanol, and bubbled for one hour by blowing nitrogen thereinto. Subsequently, the temperature of the solution was raised up to 60° C. for performing polymerization for 4 hours. After finishing the reaction, the polymer solution obtained was added dropwise to 1.5 liter of acetone. The precipitate obtained was dissolved in a water-ethanol mixed liquid of 8:2 weight ratio, to prepare a crude polymer aqueous solution containing 12.8 wt % of a polymer. The crude polymer aqueous solution was contacted with a ultrafiltration membrane having molecular cutoff of 10000, manufactured by AMICON CO., and ultrafiltration was performed for 16 hours, while negative pressure was set on the permeated liquid side and the water-ethanol mixed liquid of 8:2 weight ratio was added once in every two hours. The molecular weight and impurities of the polymer aqueous solution obtained were measured by the same method as in Example 1. The polymer contained in the polymer aqueous solution obtained had phosphorylcholine groups, and had the number average molecular weight of 211000. 2.1 ppm of 2-(methacryloyloxy)ethyl-2'-(trimethylammonio)ethyl phosphate, 1.6 ppm of t-butyl peroxypivalate, 1.2 ppm of degradation products of the polymerization initiator, and 0.5 ppm of acetone were contained as the impurities. The polymer aqueous solution was odorless. The content of the polymer in the polymer aqueous solution obtained was 22.6 wt %, and the amount of the impurities with respect to the total amount of the polymer and the impurities was 23.9 ppm.

Example 4

60 g (203 mmol) of 2-(methacryloyloxy)ethyl-2'-(trimethylammonio)ethyl phosphate and 0.5 g (1.79 mmol) of 4,4'-azobis(4-cyanopentanoic acid) were dissolved in 120 g of ethanol, and bubbled for one hour by blowing nitrogen thereinto. Subsequently, the temperature of the solution was raised up to 70° C. for performing polymerization for 4 hours. After finishing the reaction, the polymer solution obtained was concentrated by an evaporator until the weight thereof became 80 g, and then dissolved in a water-ethanol mixed liquid of 5:5 weight ratio, to prepare a crude polymer aqueous solution containing 20.2 wt % of a polymer. This crude polymer aqueous solution was contacted with the water-ethanol mixed liquid of 5:5 weight ratio, with a reverse osmosis membrane manufactured by MITSUI TOATSU CO. interposed therebetween, and reverse osmosis was performed for 10 hours, while a pressure of 2 kg/cm$^2$ was applied on the crude polymer aqueous solution side and the water-ethanol mixed liquid of 5:5 weight ratio was added once in every one hour. The molecular weight and impurities of the polymer aqueous solution obtained was measured by the same method as in Example 1. The polymer contained in the polymer aqueous solution obtained had phosphorylcholine groups, and had the number average molecular weight of 159000. 2.9 ppm of 2-(methacryloyloxy)ethyl-2'-(trimethylammonio)ethyl phosphate, 2.1 ppm of 4,4'-azobis (4-cyanopentanoic acid), and 1.6 ppm of degradation products of the polymerization initiator were contained as the impurities. The polymer aqueous solution was odorless. The content of the polymer in the polymer aqueous solution obtained was 38.8 wt %, and the amount of the impurities with respect to the total amount of the polymer and the impurities was 17.0 ppm.

Example 5

1 g (2.92 mmol) of 2-(p-vinylbenzyloxy)ethyl-2'-(trimethylammonio)ethyl phosphate, and 0.06 g (0.26 mmol) of succinic peroxide were dissolved in 9 g of ion-exchanged water, and degassed under freezing condition. The temperature of the solution was then raised up to 70° C. for polymerization for 5 hours, to obtain a crude polymer aqueous solution containing 9.3 wt % of a polymer. After finishing the reaction, the crude polymer aqueous solution was contacted with a dialysis membrane having molecular cutoff of 6000 to 8000, manufactured by SPECTRAPORE CO., and dialyzed for 72 hours, using 1.5 liter of ion-exchanged water as a dialysis liquid, which was exchanged once in every 24 hours and two times in the whole dialysis. The molecular weight and impurities of the polymer aqueous solution obtained were measured by the same method as in Example 1. The polymer contained in the polymer aqueous solution obtained had phosphorylcholine groups, and had the number average molecular weight of 52000. 1.2 ppm of 2-(p-vinylbenzyloxy)ethyl-2'-(trimethylammonio) ethyl phosphate, 0.2 ppm of succinic peroxide, and 0.1 ppm of degradation products of the polymerization initiator were contained as the impurities. The polymer aqueous solution was odorless. The content of the polymer in the polymer aqueous solution obtained was 7.3 wt %, and the amount of the impurities with respect to the total amount of the polymer and the impurities was 19.7 ppm.

Example 6

1 g (2.71 mmol) of hydroxyethyl-(2'-trimethylammonioethylphosphorylethyl)maleate and 0.06 g (0.26 mmol) of succinic peroxide were dissolved in 9 g of ion-exchanged water, and degassed under freezing condition. The temperature of the solution was then raised up to 70° C. for polymerization for 5 hours, to obtain a crude polymer aqueous solution containing 8.2 wt % of a polymer. After finishing the reaction, the crude polymer aqueous solution was contacted with a dialysis membrane having molecular cutoff of 6000 to 8000, manufactured by SPECTRAPORE CO., and dialyzed for 72 hours, using 1.5 liter of ion-exchanged water as a dialysis liquid, which was exchanged once in every 24 hours and two times in the whole dialysis. The molecular weight and impurities of the polymer aqueous solution obtained were measured by the same method as in Example 1. The polymer contained in the polymer aqueous solution obtained had phosphorylcholine groups, and had the number average molecular weight of 32000. 1.5 ppm of hydroxyethyl-(2'-trimethylammonioethylphosphorylethyl) maleate, 0.2 ppm of succinic peroxide, and 0.2 ppm of degradation products of the polymerization initiator were contained as the impurities. The polymer aqueous solution was odorless. The content of the polymer in the polymer aqueous solution obtained was 5.9 wt %, and the amount of the impurities with respect to the total amount of the polymer and the impurities was 32.2 ppm.

Example 7

1 g (3.10 mmol) of 2-(allyloxy)ethyl-2'-(trimethylammonio)ethyl phosphate and 0.06 g (0.26 mmol) of succinic peroxide were dissolved in 9 g of ion-exchanged water, and degassed under freezing condition. The temperature of the solution was then raised up to 70° C. for polymerization for 5 hours, to obtain a crude polymer aqueous solution containing 4.8 wt % of a polymer. After finishing the reaction, the crude polymer aqueous solution was contacted with a dialysis membrane having molecular cutoff of 6000 to 8000, manufactured by SPECTRAPORE CO., and dialyzed for 72 hours, using 1.5 liter of ion-exchanged water as a dialysis liquid, which was exchanged once in every 24 hours and two times in the whole dialysis. The molecular weight and impurities of the polymer aqueous solution obtained were measured by the same method as in Example 1. The polymer contained in the polymer aqueous solution obtained had phosphorylcholine groups, and had the number average molecular weight of 28000. 0.5 ppm of 2-(allyloxy)ethyl-2'-(trimethylammonio)ethyl phosphate, 0.1 ppm of succinic peroxide, and 0.3 ppm of degradation products of the polymerization initiator were contained as the impurities. The polymer aqueous solution was odorless. The content of the polymer in the polymer aqueous solution obtained was 3.1 wt %, and the amount of the impurities with respect to the total amount of the polymer and the impurities was 29.0 ppm.

Example 8

30 g (102 mmol) of 2-(methacryloyloxy)ethyl-2'-(trimethylammonio)ethyl phosphate, 0.6 g (0.26 mmol) of succinic peroxide and 1 g (10.9 mmol) of mercaptoacetic acid were dissolved in 70 g of ion-exchanged water, and bubbled for one hour by blowing nitrogen thereinto. Subsequently, the temperature of the solution was raised up to 70° C. for performing polymerization for 5 hours to obtain a crude polymer aqueous solution containing 28.2 wt % of a polymer. After finishing the reaction, the crude polymer aqueous solution was contacted with a dialysis membrane having molecular cutoff of 3500, manufactured by SPECTRAPORE CO., and dialyzed for 72 hours, using 15 liter of ion-exchanged water as a dialysis liquid, which was exchanged once in every 24 hours and two times in the whole dialysis. The molecular weight and impurities of the polymer aqueous solution obtained were measured by the same method as in Example 1. The polymer contained in the polymer aqueous solution obtained had phosphorylcholine groups, and had the number average molecular weight of 8500. 0.6 ppm of 2-(methacryloyloxy)ethyl-2'-(trimethylammonio)ethyl phosphate, 0.2 ppm of succinic peroxide, 0. 4 ppm of degradation products of the polymerization initiator, and 0.3 ppm of mercaptoacetic acid were contained as the impurities. The polymer aqueous solution was odorless. The content of the polymer in the polymer aqueous solution obtained was 21.0 wt %, and the amount of the impurities with respect to the total amount of the polymer and the impurities was 7.1 ppm.

Example 9

10 g (33.9 mmol) of 2-(methacryloyloxy)ethyl-2'-(trimethylammonio)ethyl phosphate, 10 g (76.9 mmol) of 2-hydroxyethyl methacrylate and 0.06 g (0.35 mmol) of t-butyl peroxypivalate were dissolved in 80 g of ethanol, and bubbled for one hour by blowing nitrogen thereinto. Subsequently, the temperature of the solution was raised up to 60° C. for performing polymerization for 4 hours. After finishing the reaction, the polymer solution obtained was added dropwise to 1.5 liter of acetone. The precipitate obtained was dissolved in water to prepare a crude polymer aqueous solution containing 25.0 wt % of a polymer. The crude polymer aqueous solution was contacted with a dialysis membrane having molecular cutoff of 6000 to 8000 manufactured by SPECTRAPORE CO., and dialyzed for 72 hours, using 15 liter of ion-exchanged water as a dialysis liquid, which was exchanged once in every 24 hours and two times in the whole dialysis. The molecular weight and impurities of the polymer aqueous solution were measured by the same method as in Example 1. The polymer contained in the polymer aqueous solution obtained had phosphorylcholine groups, and had the number average molecular weight of 23000. 0.2 ppm of 2-(methacryloyloxy)ethyl-2'-(trimethylammonio)ethyl phosphate, 0.3 ppm of 2-hydroxyethylmethacrylate, 0.1 ppm of t-butyl peroxypivalate, 0.3 ppm of degradation products of the polymerization initiator, 0.6 ppm of ethanol, and 1.2 ppm of acetone were contained as the impurities. The polymer aqueous solution was odorless. The content of the polymer in the polymer aqueous solution obtained was 20.5 wt %, and the amount of the impurities with respect to the total amount of the polymer and the impurities was 13.2 ppm.

Example 10

10 g (33.9 mmol) of 2-(methacryloyloxy)ethyl-2'-(trimethylammonio)ethyl phosphate, 10 g (116 mmol) of methacrylic acid and 0.4 g (1.71 mmol) of succinic peroxide were dissolved in 80 g of ion-exchanged water, and bubbled for one hour by blowing nitrogen thereinto. Subsequently, the temperature of the solution was raised up to 70° C. for performing polymerization for 4 hours to obtain a crude polymer aqueous solution containing 18.0 wt % of a polymer product. After finishing the reaction, the crude polymer aqueous solution was contacted with a dialysis membrane having molecular cutoff of 6000 to 8000, manufactured by SPECTRAPORE CO., and dialyzed for 72 hours, using 15 liter of ion-exchanged water as a dialysis liquid, which was exchanged once in every 24 hours and two times in the whole dialysis. The molecular weight and impurities of the polymer aqueous solution were measured by the same method as in Example 1. The polymer contained in the polymer aqueous solution obtained had phosphorylcholine groups, and had the number average molecular weight of 46000. 0.3 ppm of 2-(methacryloyloxy)ethyl-2'-(trimethylammonio)ethyl phosphate, 0.1 ppm of methacrylic acid, 0.2 ppm of succinic peroxide, and 0.5 ppm of degradation products of the polymerization initiator were contained as the impurities. The polymer aqueous solution was odorless. The content of the polymer in the polymer aqueous solution obtained was 12.7 wt %, and the amount of the impurities with respect to the total amount of the polymer and the impurities was 8.7 ppm.

Example 11

10 g (33.9 mmol) of 2-(methacryloyloxy)ethyl-2'-(trimethylammonio)ethyl phosphate, 10 g (70.4 mmol) of butyl methacrylate and 0.06 g (0.35 mmol) of t-butyl peroxypivalate were dissolved in 80 g of ethanol, and bubbled for one hour by blowing nitrogen thereinto. Subsequently, the temperature of the solution was raised up to 60° C. for performing polymerization for 4 hours. After finishing the reaction, the polymer solution obtained was added dropwise to 1.5 liter of acetone. The precipitate obtained was dissolved in a water-ethanol mixed liquid of 5:5 weight ratio, to prepare a crude polymer aqueous solution containing 24.8 wt % of a polymer. The crude polymer aqueous solution was contacted with a dialysis membrane having molecular cutoff of 6000 to 8000, manufactured by SPECTRAPORE CO., and dialyzed for 72 hours, using 15 liter of the water-ethanol mixed liquid of 5:5 weight ratio as a dialysis liquid, which was exchanged once in every 24 hours and two times in the whole dialysis. The molecular weight and impurities of the polymer aqueous solution obtained were measured by the same method as in Example 1. The polymer contained in the polymer aqueous solution obtained had phosphorylcholine groups, and had the number average molecular weight of 51000. 0.4 ppm of 2-(methacryloyloxy)ethyl-2'-(trimethylammonio)ethyl phosphate, 1.3 ppm of butyl methacrylate, 0.3 ppm of t-butyl peroxypivalate, 0. 2 ppm of degradation products of the polymerization initiator, and 0.8 ppm of acetone were contained as the impurities. The polymer aqueous solution was odorless. The content of the polymer in the polymer aqueous solution obtained was 22.3 wt %, and the amount of the impurities with respect to the total amount of the polymer and the impurities was 13.5 ppm.

Example 12

120 g (406 mmol) of 2-(methacryloyloxy)ethyl-2'-(trimethylammonio)ethyl phosphate and 3.6 g (15.4 mmol) of succinic peroxide were dissolved in 480 g of ion-exchanged water, and bubbled for one hour by blowing nitrogen thereinto. Subsequently, the temperature of the solution was raised up to 70° C. for performing polymerization for 5 hours to obtain a polymer aqueous solution containing 19.4 wt % of a polymer. After finishing the reaction, the polymer aqueous solution obtained was diluted ten times in volume with the ion-exchanged water to prepare a crude polymer aqueous solution. The crude polymer aqueous solution was then contacted with a reverse osmosis membrane manufactured by MITSUI TOATSU CO., and a pressure of 12 kg/cm$^2$ was applied on the crude polymer aqueous solution side, to concentrate the crude polymer aqueous solution to one tenth in volume. The polymer aqueous solution obtained was further diluted ten times in volume and subsequently concentrated to one tenth in volume likewise. This combined operations of dilution and concentration was repeated 5 times in total. The polymer aqueous solution obtained was then concentrated over 12 hours and finally a polymer aqueous solution containing 44.5 wt % of the polymer was obtained. 2.4 ppm of 2-(methacryloyloxy)ethyl-2'-(trimethylammonio)ethyl phosphate, 0.4 ppm of succinic peroxide, and 1.0 ppm of degradation products of the polymerization initiator were contained as the impurities. The polymer aqueous solution was odorless. The amount of the impurities with respect to the total amount of the polymer and the impurities was 8.5 ppm. This polymer aqueous solution was admixed with a commercially-available antiseptics, and diluted with the ion-exchanged water, to finally obtain an aqueous solution containing 40 wt % of the polymer and 5.0 wt % of the antiseptics. It was found out that this antiseptics-containing polymer aqueous solution was odorless, had a high antiseptic effect, and was so stable that precipitate did not occur after three-month preservation, thus being suitable for a cosmetic material.

Comparative Example 1

20 g (67.8 mmol) of 2-(methacryloyloxy)ethyl-2'-(trimethylammonio)ethyl phosphate and 0.6 g (2.56 mmol) of succinic peroxide were dissolved in 80 g of ion-exchanged water, and bubbled for one hour by blowing nitrogen thereinto. The temperature of the solution was then raised up to 70° C. for polymerization for 5 hours. After finishing the reaction, the polymer aqueous solution obtained was added dropwise to 1.5 liter of acetone, and the precipitate obtained was dissolved in water to obtain a polymer aqueous solution containing 25.1 wt % of the polymer. The molecular weight and impurities of the polymer aqueous solution were measured by the same method as in Example 1. It was found than the number average molecular weight of the polymer in the polymer aqueous solution obtained was 33000, and 8610 ppm of 2-(methacryloyloxy)ethyl-2'-(trimethylammonio)ethyl phosphate, 1260 ppm of succinic peroxide, 2570 ppm of degradation products of the polymerization initiator, and 42960 ppm of acetone were contained as the impurities. The polymer aqueous solution had an odor specific to acetone. The amount of the impurities with respect to the total amount of the polymer and the impurities was 220720 ppm.

Comparative Example 2

10 g (33.9 mmol) of 2-(methacryloyloxy)ethyl-2'-(trimethylammonio)ethyl phosphate and 0.03 g (0.17 mmol) of t-butyl peroxypivalate were dissolved in 90 g of ethanol, and bubbled for one hour by blowing nitrogen thereinto. The temperature of the solution was then raised up to 60° C. for polymerization for 4 hours. After finishing the reaction, the polymer solution obtained was added dropwise in 1.5 liter of acetone. The precipitate obtained was dissolved in water to obtain a polymer aqueous solution containing 19.7 wt % of the polymer. The molecular weight and impurities of this polymer aqueous solution was measured by the same method as in Example 1. It was found that the number average molecular weight of the polymer contained in the polymer aqueous solution obtained was 33000, and 2250 ppm of 2-(methacryloyloxy)ethyl-2'-(trimethylammonio)ethyl phosphate, 490 ppm of t-butyl peroxypivalate, 760 ppm of degradation products of the polymerization initiator, 5390 ppm of ethanol, and 27160 ppm of acetone were contained as the impurities. The polymer aqueous solution had odors specific to e.g. acetone, ethanol, and t-butyl peroxypivalate. The amount of the impurities with respect to the total amount of the polymer and the impurities was 183500 ppm.

Comparative Example 3

10 g (33.9 mmol) of 2-(methacryloyloxy)ethyl-2'-(trimethylammonio)ethyl phosphate and 0.1 g (0.61 mmol) of azobisisobutyronitrile were dissolved in 90 g of ethanol, and bubbled for one hour by blowing nitrogen thereinto. The temperature of the solution was then raised up to 60° C. for polymerization for 5 hours. After finishing the reaction, the polymer solution obtained was added dropwise to 1.5 liter of acetone. The precipitate obtained was dissolved in water to prepare a crude polymer aqueous solution containing 20.8 wt % of the polymer. The crude polymer aqueous solution was then contacted with a dialysis membrane having molecular cutoff of 6000 to 8000, manufactured by SPECTRAPORE CO., and dialyzed for 72 hours, using 15 liter of ion-exchanged water as a dialysis liquid, which was exchanged once in every 24 hours and two times in the whole dialysis. The molecular weight and impurities of the of the polymer aqueous solution obtained was measured by the same method as in Example 1. The number average molecular weight of the polymer contained in the polymer aqueous solution obtained was 34000. 0.4 ppm of 2-(methacryloyloxy)ethyl-2'-(trimethylammonio)ethyl phosphate, 581.3 ppm of azobisisobutyronitrile, 825.7 ppm of degradation products of the polymerization initiator, 0.5 ppm of ethanol, and 1.2 ppm of acetone were contained as the impurities. The content of the polymer in the polymer aqueous solution obtained was 17.2 wt %, and the amount of the impurities with respect to the total amount of the polymer and the impurities was 8190 ppm.

Comparative Example 4

10 g (33.9 mmol) of 2-(methacryloyloxy)ethyl-2'-(trimethylammonio)ethyl phosphate and 0.15 g (0.62 mmol) of benzoyl peroxide were dissolved in 90 g of ethanol, and bubbled for one hour by blowing nitrogen thereinto. The temperature of the solution was then raised up to 60° C. for polymerization for 5 hours. After finishing the reaction, the polymer solution obtained was added dropwise to 1.5 liter of acetone. The precipitate obtained was dissolved in a water-ethanol mixed liquid of 5:5 weight ratio to prepare a crude polymer aqueous solution containing 10.0 wt % of the polymer. The crude polymer aqueous solution was then contacted with a dialysis membrane having molecular cutoff of 6000 to 8000, manufactured by SPECTRAPORE CO., and dialyzed for 72 hours, using 15 liter of the water-ethanol mixed liquid of 5:5 weight ratio as a dialysis liquid, which was exchanged once in every 24 hours and two times in the whole dialysis. The molecular weight and impurities of the polymer aqueous solution obtained was measured by the same method as in Example 1. The number average molecular weight of the polymer contained in the polymer aqueous solution obtained was 35000. 0.2 ppm of 2-(methacryloyloxy)ethyl-2'-(trimethylammonio)ethyl phosphate, 292.6 ppm of benzoyl peroxide, 172.2 ppm of degradation products of the polymerization initiator, and 0.7 ppm of acetone were contained as the impurities. The content of the polymer in the polymer aqueous solution obtained was 8.5 wt %, and the amount of the impurities with respect to the total amount of the polymer and the impurities was 5480 ppm.

Comparative Example 5

30 g (102 mmol) of 2-(methacryloyloxy)ethyl-2'-(trimethylammonio)ethyl phosphate, 2 g (43.5 mmol) of ethanol, 3.0 g (49.0 mmol)of ammonium cerium (IV) nitrate and 10 ml of 0.1N nitric acid were dissolved in 80 g of ion-exchanged water, and bubbled for 30 minutes by blowing nitrogen thereinto. The temperature of the solution was then raised up to 40° C. for polymerization for 2 hours, to obtain a crude polymer aqueous solution containing 16.4 wt % of the polymer. After finishing the reaction, the crude polymer aqueous solution obtained was contacted with a dialysis membrane having molecular cutoff of 6000 to 8000, manufactured by SPECTRAPORE CO., and dialyzed for 72 hours, using 15 liter of the ion-exchanged water as a dialysis liquid, which was exchanged once in every 24 hours and two times in the whole dialysis. Subsequently, a part of the sample was taken out, and dialyzed for 168 hours in total with the dialysis liquid, which was exchanged once in every 24 hours, i.e. 4 times during the dialysis. The molecular weight and impurities of the polymer aqueous solution obtained after 72-hour dialysis was measured by the same method as in Example 1. The number average molecular weight of the polymer contained in the polymer aqueous solution obtained was 16000. 0.3 ppm of 2-(methacryloyloxy)ethyl-2'-(trimethylammonio)ethyl phosphate were contained as the impurities after 72-hour dialysis. The amount of residual cerium measured by ICP (Inductively Coupled Plasma) emission analysis was 813 ppm after 72-hour dialysis and 778 ppm after 168-hour dialysis with respect to the total amount of the polymer and cerium.

In this Comparative Example, the polymer aqueous solution does not have high content of 2-(methacryloyloxy)ethyl-2'-(trimethylammonio)ethyl phosphate as impurities, but contains cerium which is not contained in the polymer aqueous solution of the present invention, since ammonium cerium (IV) nitrate which is not employed in the present invention is employed as a polymerization initiator.

What is claimed is:

1. A method for producing an aqueous solution of a polymer having a phosphorylcholine group comprising the steps of:

polymerizing a polymerizable composition containing a polymerizable monomer having the phosphorylcholine group represented by the formula (I) in a water-containing medium in the presence of a non-metal polymerization initiator soluble in a water-containing medium, to obtain a crude polymer aqueous solution, wherein said non-metal polymerization initiator is selected from the group consisting of succinic peroxyglutarate, t-butyl peroxymaleate, t-butyl peroxypivalate, di-2-ethoxyethyl peroxydicarbonate, 3-hydroxy-1,1-dimethylbutyl peroxypivalate, 1-(1-cyano-1-methylethyl)azo)formamide, 2,2'-azobis(2-methyl-N-phenylpropionamidine)dihydrochloride, 2,2'-azobis(N-(4-chlorophenyl)-2-methylpropionamidine)dihydrochloride, 2,2'-azobis(N-(4-hydroxyphenyl)-2-methylpropionamidine)dihydrochloride, 2,2'-azobis(N-(4-aminophenyl)-2-methylpropionamidine)tetrahydrochloride, 2,2'-azobis(2-methyl-N-(phenylmethyl)propionamidine)dihydrochloride, 2,2'-azobis(2-methyl-N-2-propenylpropionamidine)dihydrochloride, 2,2'-azobis(2-methylpropionamidine)dihydrochloride, 2,2'-azobis(N-(2-hydroxyethyl)-2-methylpropionamidine)dihydrochloride, 2,2'-azobis (2-(5-methyl-2-imidazolin-2-yl)propane)dihydrochloride, 2,2'-azobis(2-(2-imidazolin-2-yl)propane)dihydrochloride, 2,2'-azobis(2-(4,5,6,7-tetrahydro-1H-1,3-diazepin-2-yl)propane)dihydrochloride, 2,2'-azobis(2-(3,4,5,6-tetrahydropyrimidin-2-yl)propane dihydrochloride, 2,2'-azobis(2-(5-hydroxy-3,4,5,6-tetrahydropyrimidin-2-yl)propane) dihydrochloride, 2,2'-azobis(2-(1-(2-hydroxyethyl)-2-imidazolin-2-yl)propane) dihydrochloride, 2,2'-azobis(2-(2-imidazolin-2-yl) propane), 2,2'-azobis(2-methyl-N-(1,1-bis (hydroxymethyl)-2-hydroxyethyl)propionamide), 2,2'-azobis (2-methyl-N-(1,1-bis(hydroxymethyl)ethyl) propionamide),2,2'-azobis(2-methyl-N-(2-hydroxyethyl)propionamide), 2,2'-azobis(2-methylpropionamide)dihydrate, 4,4'-azobis(4-cyanopentanoic acid),2,2'-azobis(2-hydroxymethyl) propionitrile), and mixtures thereof, and then purifying said crude polymer aqueous solution with a separation membrane, wherein said crude polymer aqueous solution subjected to the purifying step contains said polymer having the phosphorylcholine group at a concentration of 0.5 to 80 wt % thereof:

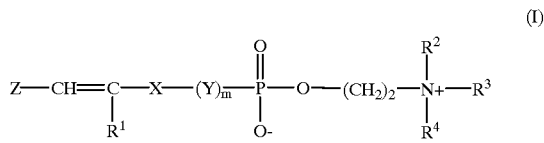

(I)

(wherein X denotes a divalent organic residue, Y denotes an alkyleneoxy group having 1 to 6 carbon atoms, and Z denotes a hydrogen atom or $R^5$ —O—CO-(wherein $R^5$ denotes an alkyl group having 1 to 10 carbon atoms or a hydroxyalkyl group having 1 to 10 carbon atoms), $R^1$ denotes a hydrogen atom or a methyl group, $R^2$, $R^3$ and $R^4$ are the same or different groups and denote a hydrogen atom, or a hydrocarbon or hydroxy substituted hydrocarbon group having 1 to 6 carbon atoms and m denotes 0 or 1).

2. A method for producing an aqueous solution of a polymer having a phosphorylcholine group comprising the steps of:

polymerizing a polymerizable composition containing a polymerizable monomer having the phosphorylcholine group represented by the formula (I) in an organic medium or without a medium in the presence of a non-metal polymerization initiator soluble in a water-containing medium, to obtain crude polymer having the phosphorylcholine group, wherein said non-metal polymerization initiator is selected from the group consisting of succinic peroxyglutarate, t-butyl peroxymaleate, t-butyl peroxypivalate, di-2-ethoxyethyl peroxydicarbonate, 3-hydroxy-1,1-dimethylbutyl peroxypivalate, 1-((1-cyano-1-methylethyl)azo)formamide, 2,2'-azobis (2-methyl-N-phenylpropionamidine)dihydrochloride,2,2'-azobis (N-(4-chlorophenyl)-2-methylpropionamidine) dihydrochloride,2,2'-azobis (N-(4-hydroxyphenyl)-2-methylpropionamidine)dihydrochloride, 2,2'-azobis(N-(4-aminophenyl)-2-methylpropionamidine) tetrahydrochloride, 2,2'-azobis(2-methyl-N-(phenylmethyl)propionamidine)dihydrochloride, 2,2'-azobis(2-methyl-N-2-propenylpropionamidine) dihydrochloride, 2,2'-azobis(2-methylpropionamidine) dihydrochloride, 2,2'-azobis(N-(2-hydroxyethyl)-2-methylpropionamidine)dihydrochloride, 2,2'-azobis(2-(5-methyl-2-imidazolin-2-yl)propane)dihydrochloride, 2,2'-azobis(2-(2-imidazolin-2-yl)propane) dihydrochloride, 2,2'-azobis(2-(4,5,6,7-tetrahydro-1H-1,3-diazepin-2-yl)propane)dihydrochloride, 2,2'-azobis (2-(3,4,5,6-tetrahydropyrimidin-2-yl)propane dihydrochloride, 2,2'-azobis(2-(5-hydroxy-3,4,5,6-tetrahydropyrimidin-2-yl)propane)dihydrochloride, 2,2'-azobis(2-(1-(2-hydroxyethyl)-2-imidazolin-2-yl) propane)dihydrochloride, 2,2'-azobis(2-(2-imidazolin-2-yl)propane), 2,2'-azobis(2-methyl-N-(1,1-bis (hydroxymethyl)-2-hydroxyethyl)propionamide), 2,2'-azobis(2-methyl-N-(1,1-bis(hydroxymethyl)ethyl) propionamide), 2,2'-azobis(2-methyl-N-(2- hydroxyethyl)propionamide), 2,2'-azobis(2-methylpropionamide)dihydrate,4,4'-azobis(4-cyanopentanoic acid), 2,2'-azobis(2-hydroxymethyl) propionitrile), and mixtures thereof, adding a water-containing medium to said crude polymer to obtain a crude polymer aqueous solution containing the polymer having the phosphorylcholine group at a concentration of 0.5 to 80 wt % thereof, and then purifying said crude polymer aqueous solution with a separation membrane:

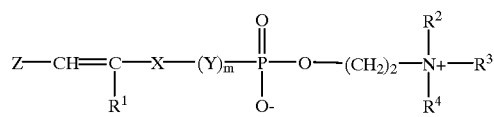
(I)

(wherein X denotes a divalent organic residue, Y denotes an alkyleneoxy group having 1 to 6 carbon atoms, and Z denotes a hydrogen atom or $R^5$—CO—(wherein $R^5$ denotes an alkyl group having 1 to 10 carbon atoms or a hydroxyalkyl group having 1 to 10 carbon atoms), $R^1$ denotes a hydrogen atom or a methyl group, $R^2$, $R^3$ and $R^4$ are the same or different groups and denote a hydrogen atom, or a hydrocarbon or hydroxy substituted hydrocarbon group having 1 to 6 carbon atoms and m denotes 0 or 1.

3. The method as claimed in claim 1 or 2 wherein said purifying step with a separation membrane is repeated until the content of said polymer having the phosphorylcholine group in said aqueous solution becomes 5 to 60 wt %.

* * * * *

UNITED STATES PATENT AND TRADEMARK OFFICE
CERTIFICATE OF CORRECTION

PATENT NO.    : 6,204,324 B1                                           Page 1 of 1
DATED         : March 20, 2001
INVENTOR(S)   : Kenshiro Shuto et al.

It is certified that error appears in the above-identified patent and that said Letters Patent is hereby corrected as shown below:

Title page,
Item [75], Inventor, change "Kenshiro Shuto; Kazuo Matsuyama; both of Isukuba (JP)" to -- Kenshiro Shuto; Kazuo Matsuyama; both of Ibaraki, (JP) --; "Nobou Nakabayashi, 5-6-20, Koganehara, Matsudo-shi,chiba, 270 (JP)" to -- Nobou Nakabayashi, Chiba, (JP) --; "Kazuhiko Ishihara, 3-16-37, Josuihoncho, Kodaira-shi, Tokyo 187 (JP)" to -- Kazuhiko Ishihara, Tokyo, (JP) --.

Item [30], Foreign Application Priority Data, change, "April 1, 1996 (JP) ...... 8-787731" to -- April 1, 1996 (JP) .......8-78731.

Signed and Sealed this

Eighth Day of January, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,204,324 B1
DATED        : March 20, 2001
INVENTOR(S)  : Kenshiro Shuto et al.

It is certified that error appears in the above-identified patent and that said Letters Patent is hereby corrected as shown below:

<u>Title page,</u>
Item [75], Inventor, change "Kenshiro Shuto; Kazuo Matsuyama; both of Isukuba (JP)" to -- Kenshiro Shuto; Kazuo Matsuyama; both of Ibaraki, (JP) --; "Nobuo Nakabayashi, 5-6-20, Koganehara, Matsudo-shi, Chiba, 270 (JP)" to -- Nobuo Nakabayashi, Chiba, (JP) --; "Kazuhiko Ishihara, 3-16-37, Josuihoncho, Kodaira-shi, Tokyo 187 (JP)" to -- Kazuhiko Ishihara, Tokyo, (JP) --.

Item [30], Foreign Application Priority Data, delete "April 1, 1996 (JP) ...... 8-787731" to -- April 1, 1996 (JP) ........8-78731 --.

Signed and Sealed this

Eleventh Day of February, 2003

JAMES E. ROGAN
*Director of the United States Patent and Trademark Office*